US012537647B2

(12) United States Patent
Mei et al.

(10) Patent No.: US 12,537,647 B2
(45) Date of Patent: Jan. 27, 2026

(54) METHODS, DEVICES AND SYSTEMS FOR REPORTING FREQUENCY OFFSET

(71) Applicant: ZTE CORPORATION, Guangdong (CN)

(72) Inventors: Meng Mei, Shenzhen (CN); Chuangxin Jiang, Shenzhen (CN); Zhaohua Lu, Shenzhen (CN); Bo Gao, Shenzhen (CN); Hao Wu, Shenzhen (CN); Shujuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 340 days.

(21) Appl. No.: 18/332,499

(22) Filed: Jun. 9, 2023

(65) Prior Publication Data

US 2023/0412343 A1    Dec. 21, 2023

Related U.S. Application Data

(63) Continuation of application No. PCT/CN2021/092972, filed on May 11, 2021.

(51) Int. Cl.
*H04L 5/00* (2006.01)
*H04W 76/19* (2018.01)
*H04W 76/20* (2018.01)

(52) U.S. Cl.
CPC ........... *H04L 5/0051* (2013.01); *H04W 76/19* (2018.02); *H04W 76/20* (2018.02)

(58) Field of Classification Search
CPC ...... H04L 5/0051; H04W 76/19; H04W 76/20
See application file for complete search history.

(56) References Cited

U.S. PATENT DOCUMENTS

| 2018/0323918 A1 | 11/2018 | Chuang et al. |
| 2020/0205116 A1 | 6/2020 | Zhang et al. |
| 2021/0006380 A1 | 1/2021 | Zhou et al. |

(Continued)

FOREIGN PATENT DOCUMENTS

| CN | 109586880 A | 4/2019 |
| CN | 111096023 A | 5/2020 |

(Continued)

OTHER PUBLICATIONS

Ericsson, "Enhancement on HST-SFN deployment", 3GPP TSG-RAN WG1 Meeting #105-e, Tdoc R1-2105586, May 27, 2021, e-Meeting (24 pages).

(Continued)

*Primary Examiner* — Derrick V Rose
(74) *Attorney, Agent, or Firm* — Foley & Lardner LLP

(57) ABSTRACT

A system, device and method for reporting frequency offset is disclosed. In one aspect, a method includes receiving, by a wireless communication device from a wireless communication node, at least a first resource configuration to configure a pair of reference signals (RSs) to the wireless communication device for reporting of frequency offsets of the pair of RSs; performing, by the wireless communication device, measurement of the frequency offsets of the pair of RSs, the pair of RSs including a first reference signal (RS) and a second RS; and sending, by the wireless communication device to the wireless communication node according to the at least a first resource configuration, at least one report of the frequency offsets.

20 Claims, 5 Drawing Sheets

(56) References Cited

U.S. PATENT DOCUMENTS

| | | | |
|---|---|---|---|
| 2021/0028843 A1 | 1/2021 | Zhou et al. | |
| 2022/0158805 A1* | 5/2022 | Frenne | H04W 72/23 |
| 2023/0141785 A1* | 5/2023 | Manolakos | H04W 24/10 |
| | | | 455/67.16 |
| 2024/0205695 A1* | 6/2024 | Muruganathan | H04L 5/0069 |
| 2024/0267165 A1* | 8/2024 | Liu | H04L 5/0005 |

FOREIGN PATENT DOCUMENTS

| | | | | |
|---|---|---|---|---|
| WO | WO-2019129018 A1 * | 7/2019 | | H04L 5/0048 |
| WO | WO-2021/008432 A1 | 1/2021 | | |

OTHER PUBLICATIONS

Interdigital Inc., "Further Discussion on HST-SFN", 3GPP TSG RAN WG1 #105-e, R1-2104295, May 27, 2021, e-Meeting (13 pages).

Lenovo et al., "Enhancements for HST-SFN deployment", 3GPP TSG RAN WG1 #105-e, R1-2105761, May 27, 2021, e-Meeting (14 pages).

Moderator (Intel Corporation), "Summary#4 of AI: 8.1.2.4 Enhancements on HST-SFN deployment", 3GPP TSG RAN WG1 #104b-e, R1-2104068, Apr. 20, 2021, e-Meeting (78 pages).

Qualcomm Incorporated, "Enhancements on HST-SFN deployment", 3GPP TSG-RAN WG1 Meeting #104bis-e, R1-2104657, May 27, 2021, e-Meeting (46 pages).

Vivo, "Further discussion and evaluation on HST-SFN transmission schemes", 3GPP TSG RAN WG1 #105-e, R1-2104346, May 27, 2021, e-Meeting (15 pages).

Extended European Search Report for EP Appl. No. 21941232.7, dated Mar. 14, 2024 (13 pages).

Nokia et al., "Enhancements for HST-SFN deployment", 3GPP TSG RAN WG1 #103-3 Meeting, R1-2008907, Nov. 13, 2020, e-Meeting (12 pages).

Qualcomm Incorporated, "Enhancements on HST-SFN deployment", 3GPP TSG-RAN WG1 Meeting #102-e, R1-2009254, Nov. 13, 2020, e-Meeting (21 pages).

Intel Corporation, "Remaining Details on TRS" 3GPP TSG RAN WG1 Meeting NR#3, R1-1716303, Sep. 21, 2017, Nagoya, Japan (4 pages).

International Search Report and Written Opinion for PCT Appl. No. PCT/CN2021/092972, mailed Feb. 10, 2022 (8 pages).

* cited by examiner

| R | Serving Cell ID | BWP ID | Oct 1 |
| $C_0$ | TCI state $ID_{0,1}$ | | Oct 2 |
| R | TCI state $ID_{0,2}$ | | Oct 3 (Optional) |

...

| $C_N$ | TCI state $ID_{N,1}$ | Oct M-1 |
| R | TCI state $ID_{N,2}$ | Oct M (Optional) |

FIG. 3

METHODS, DEVICES AND SYSTEMS FOR REPORTING FREQUENCY OFFSET

CROSS-REFERENCE TO RELATED APPLICATION

This application claims the benefit of priority under 35 U.S.C. § 120 as a continuation of PCT Patent Application No. PCT/CN2021/092972, filed on May 11, 2021, the disclosure of which is incorporated herein by reference in its entirety.

TECHNICAL FIELD

The disclosure relates generally to wireless communications and, more particularly, to systems and methods for reporting frequency offset.

BACKGROUND

In a single frequency network (SFN) scenario, two transmission reception points (TRPs) transmit same information to one user equipment (UE), but in a high speed train (HST)-SFN scenario, the UE moves from one TRP to the other TRP causing Doppler effects such that a first Doppler effect with respect to one TRP may be opposite of a second Doppler effect with respect to the other TRP.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

A system, device and method for reporting frequency offset is disclosed. In one aspect, a method includes receiving, by a wireless communication device from a wireless communication node, at least a first resource configuration to configure a pair of reference signals (RSs) to the wireless communication device for reporting of frequency offsets of the pair of RSs; performing, by the wireless communication device, measurement of the frequency offsets of the pair of RSs, the pair of RSs including a first reference signal (RS) and a second RS; and sending, by the wireless communication node according to the at least a first resource configuration, at least one report of the frequency offsets.

In some embodiments, the method includes sending, by the wireless communication device to the wireless communication node, the at least one report in response to an configuration in a radio resource control (RRC) signaling, or in response to a medium access control control element (MAC CE) signaling, or in response to a trigger of the wireless communication device.

In some embodiments, the method includes receiving, by the wireless communication device from the wireless communication node, a first report configuration corresponding to the first RS of the RS pair, and a second report configuration corresponding to the second RS of the RS pair.

In some embodiments, the method includes sending, by the wireless communication device to the wireless communication node, at least a first report and a second report in response to a single indication in a medium access control control element (MAC CE) signaling; or sending, by the wireless communication device to the wireless communication node, a first report in response to a first indication in the MAC CE signaling, and a second report in response to a second indication in the MAC CE signaling.

In some embodiments, the MAC CE signaling activates at least one transmission configuration indicator (TCI) state for physical downlink control channel (PDCCH) or physical downlink shared channel (PDSCH) transmission, or for frequency offset reporting.

In some embodiments, the method includes sending, by the wireless communication device to the wireless communication node, the at least one report of the frequency offsets according to a periodicity or time window in a default configuration or configured via radio resource control (RRC) signaling.

In another aspect a method includes sending, by a wireless communication node to a wireless communication device, at least a first resource configuration to configure a pair of reference signals (RSs) to the wireless communication device for reporting of frequency offsets of the pair of RSs, wherein the wireless communication device performs measurement of the frequency offsets of the pair of RSs, the pair of RSs including a first reference signal (RS) and a second RS; and receiving, by the wireless communication node from the wireless communication device according to the at least a first resource configuration, at least one report of the frequency offsets.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 illustrates an example diagram of transmission configuration information (TCI) states activation/deactivation for user equipment (UE)-specific physical downlink share channel (PDSCH) medium access control (MAC) control element (CE), in accordance with some embodiments of the present disclosure.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
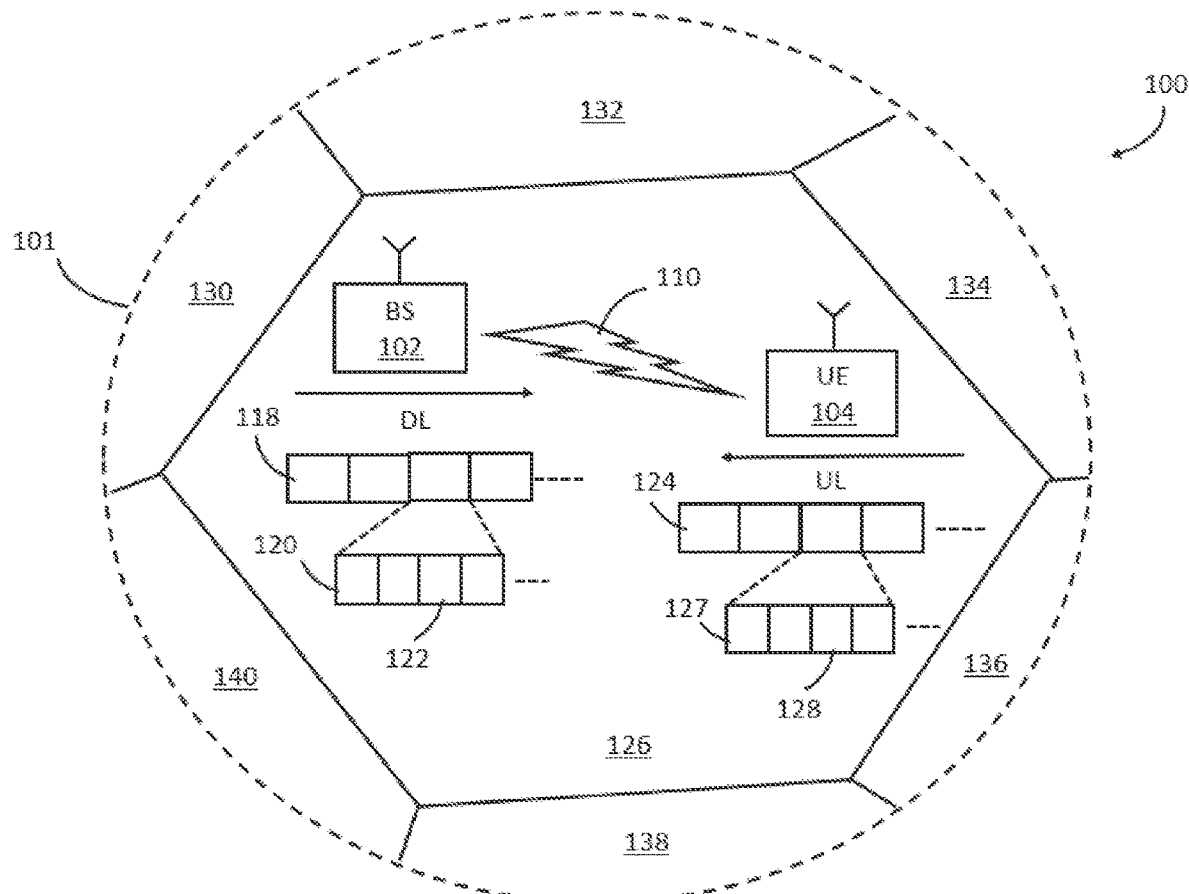
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
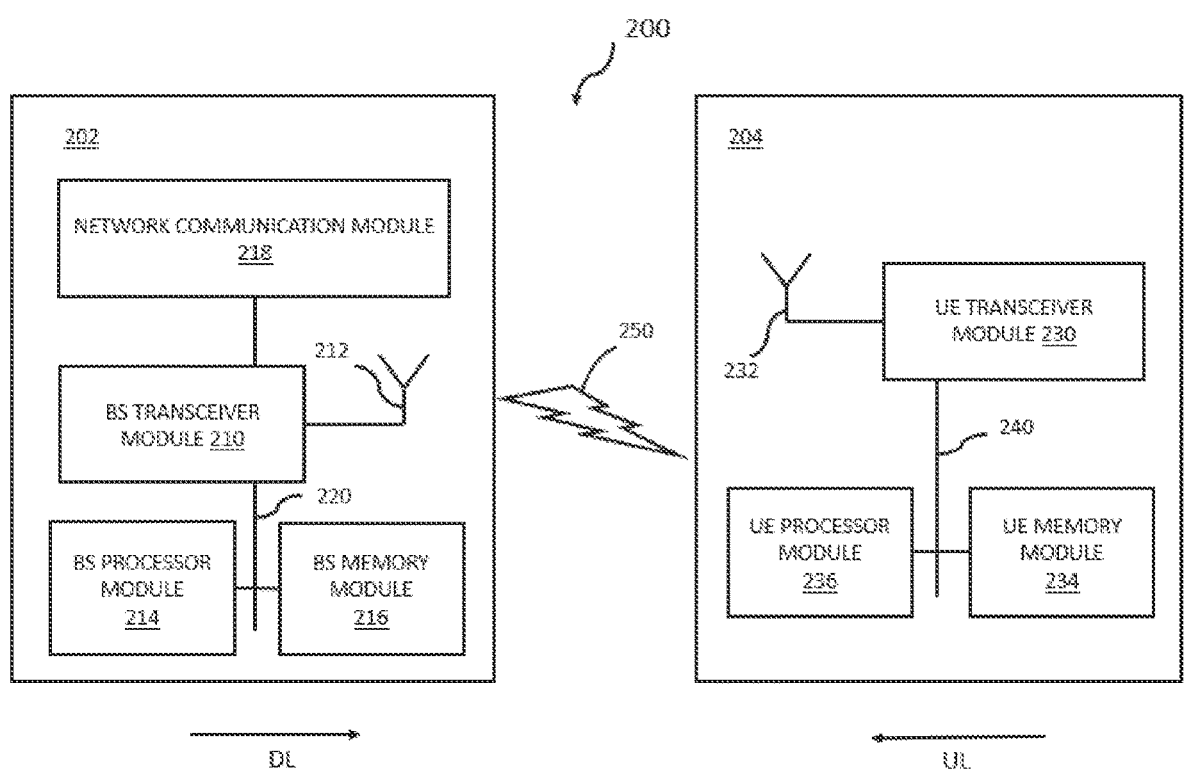
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. Reporting Frequency Offset

In a single frequency network (SFN) scenario, if pre-compensation is supported, a frequency offset can provided to a gNB side (e.g., a next generation NodeB (gNB), a base station (BS), the BS 102, the BS 202, a wireless communication node, a cell, a cell tower, a radio access device, etc.), so the gNB can use the frequency offset for pre-compensation. Although the gNB is referred to in the disclosure, eNodeBs (eNBs) or non-3GPP radio access devices are within the scope of the disclosure. A user equipment (a UE, e.g., the UE 104, the UE 204, a mobile device, a wireless communication device, a terminal, etc.) can measure or estimate the frequency offset caused by high speed according to a tracking reference signal (TRS) associated to each transmission configuration information (TCI) state. Once the frequency offset is estimated, the UE can report the frequency offset to the gNB. Described herein is a manner in which to report the frequency offset of multiple TRSs in the SFN-based transmission.

In the SFN-based transmission, multiple transmission reception points (TRPs, e.g., terrestrial networks, towers, antenna arrays, etc.) can transmit a same physical downlink shared channel (PDSCH) or a physical downlink control channel (PDCCH) to one UE. But, in a high speed (e.g., high speed train) scenario, for instance, the UE moves fast from one TRP to other TRP, so the frequency offset (e.g., Doppler shift) caused by the high speed are different from different TRPs to the UE, or even opposite, and PDSCH or PDCCH from different TRPs can be combined at the UE side after reception. The different frequency offsets may impact a PDSCH or PDCCH estimation. For example, if the UE is in the middle of the two TRPs, the frequency offsets are opposite from the two TRPs, but the combined TRS ports from the two TRPs estimate the frequency offset as 0 Hz and will get the wrong frequency offsets estimation. So, different TRS ports can be configured for different TRPs for the UE to estimate the frequency offsets.

Pre-compensation at the gNB side can be used to pre-compensate the frequency offsets and make the PDSCH or PDCCH aligned from different TRPs. One technological challenge is that the gNB is to get the frequency offsets of different TRS ports, and use them to pre-compensate the PDSCH or PDCCH from different TRPs.

Disclosed herein are some embodiments in which the UE reports the frequency offset, in which the reporting is triggered by a radio resource control (RRC) configuration or a medium access control (MAC) control element (CE) at the gNB side, or the reporting is triggered by the UE.

In some embodiments, the gNB configures one TRS resource set for one channel state indicator (CSI) report configuration, and the gNB configures several CSI report configurations for a frequency offset report. In some embodiments, the gNB configures the TRS resource set(s) by configuring several TRS resource set identifiers (IDs) and the 'Doppler shift/frequency offset' in a higher layer parameter for the CSI report configuration.

In some embodiments, the UE sends the frequency offset report in response to being triggered by MAC CE signaling jointly or individually. In some embodiments, the reporting is triggered by the UE. In some embodiments, a time window for the UE to report is configured by the RRC or predetermined (e.g., by default). In some embodiments, a constant or varying (e.g., RS pair specific) threshold for comparing against frequency offsets of reference signal (RS) pairs is used as the UE trigger condition.

In some embodiments, the frequency offset is associated with a control resource set (CORESET) index (ID). In some embodiments, a codepoint index or a TCI state index is associated with the reported frequency offset.

In some embodiments, the UE reports the absolute value of the Doppler shift/frequency offset estimated according to the relative TRS reference set(s). In some embodiments, differences of the frequency offset of each of the RS pairs are reported. In some embodiments, the RS pairs are configured by RRC. In some embodiments, each of the RS pairs is from one codepoint activated with 2 TCI states. In some embodiments, each of the RS pairs is from one CORESET activated with 2 TCI states.

In some embodiments, one RS in each of the RS pairs is a reference RS configured by RRC signaling or by default. In some embodiments, for PDCCH, the MAC CE activates 2 TCI states, one of the TCI states contains the reference RS, and the other TCI state contains a RS that is measured, and the offset/difference of estimation frequency offset between the measured RS and the reference RS is reported. In some embodiments, if the frequency offset report related RS is configured by the RRC, the CORESET ID can be configured in the CSI report configuration, and the CORESET is activated with 2 TCI states.

In some embodiments, for PDSCH, the first or the second TCI state in one codepoint is predetermined as the reference RS by default. For PDSCH, a first TCI state in all codepoints containing two TCI states is predetermined as the reference RS by default.

In a CSI report configuration (CSI-ReportConfig or ReportConfig), the gNB can set/configure a quantity to be reported, for instance: reportQuantity='Doppler shift/frequency offset.' The UE can, according to the TRS resource set in (or indicated in) the ReportConfig, perform measurement and reporting of absolute values of Doppler shift/frequency offset. The quantity/amount for repotting can be configured or predefined.

In a CSI-ReportConfig, the gNB can set/configure reportQuantity='Doppler shift/frequency offset,' the gNB can configure multiple TRS sets, and the gNB can specify/configure one of the TRS sets as the reference. The UE can, according to the TRS resource sets in (or indicated in) the ReportConfig, perform measurement and use the reference TRS set as the reference to report relative/difference values in Doppler shift/frequency offset.

Multiple TRS sets can be configured as/with multiple CSI resource configurations with their CSI-ResourceConfig IDs, to separately correspond to the multiple TRS sets. The gNB can configure the TRS resource set(s) and the 'Doppler shift/frequency offset' in a higher layer parameter for CSI report configuration.

The gNB can configure the CSI reporting to the UE. The UE can report the related parameters according to the CSI report configuration. In some embodiments, the parameters that are to be reported are configured in the CSI report configuration. In some embodiments, if the gNB wants the UE to report the frequency offset, the gNB configures the corresponding TRS resource set(s) in the CSI report configuration, and then the UE can identify which RS is to be measured and reported. In some embodiments, according to the 'Doppler shift/frequency offset' configured in the CSI report configuration (or configured in the "report quantity" field/parameter in the CSI report configuration), the UE determines that the frequency offset of the configured TRP resource set(s) is to be reported.

In some embodiments, the UE reports the absolute value of the Doppler shift/frequency offset estimated according to the respective TRS reference set(s). In the SFN scenario, two TRS resource sets can be configured for the two TCI states, and the UE can calculate the frequency offset according to the two TRS resource sets according to the CSI report configuration. The UE can report the estimated frequency offset according to the configured value in the "report quantity" field of the CSI report configuration. The reported value of the frequency offset can be quantified at a certain granularity. The granularity can be 50 Hz, 100 Hz, 200 Hz, or other values, and can be predefined or configured by a higher layer parameter. Additionally or alternatively, the higher layer can configure one table for the frequency offset, so that the UE can choose or select one or more values from this table according to the number of configured TRS resource sets in the CSI report configuration. The table can be configured as one group of values such as values from 0 to 2000 Hz, and the granularity can be 50 Hz, 100 Hz, 200 Hz, or other values. The UE can estimate the frequency offset of the configured TRS resource set(s), and can then choose/select suitable values from the table and report to the gNB.

Once several TRS resource sets are configured in the CSI report configuration, one of the TRS resource sets can include or correspond to a reference TRS (e.g., configured, indicated, predefined, or default), the other one or more TRS resource sets in the CSI report configuration are measured, and the UE can report the frequency offsets of the measured TRS resource sets relative to the reference TRS (sometimes referred as the reference RS).

The TRS resource sets can be configured with multiple CSI resource configuration IDs, in which each TRS resource set is associated with one CSI resource configuration ID, so that the UE can determine the TRS resource sets to be measured and reported.

The UE, by default, can report the Doppler shift offset of an RS corresponding to a TCI state of a PDSCH/PDCCH activated by the MAC CE. The UE can use a RS of an activated TCI state to be the reference. RSs of other TCI states can be measured to obtain offsets relative to this reference. In some embodiments, the UE is to only measure and report Doppler shift offset corresponding an RS of a TCI pair activated for PDSCH via MAC CE. The gNB can configure/specify TCI codepoints in the CSI-ReportConfig to indicate the RSs to be measured and reported.

In some embodiments, the UE is to only measure and report frequency offset corresponding to an RS of a TCI pair activated for the PDCCH via the MAC CE. The gNB can configure an enabling parameter in the CSI-ReportConfig to report, by default, the frequency offset corresponding to a CORESET of 2 TCI states. The gNB can configure the CORESET ID in CSI-ReportConfig to indicate the corresponding RS that is to be measured and reported. The CORESET ID can be relative, for example, the relative IDs of all CORESETs that activated 2 TCI states.

The UE can measure and report the reference signals configured in TCI states which are activated by the MAC CE. The TCI states may be the TCI states activated for the PDCCH or the PDSCH. In some embodiments, the RS contained in one of the activated TCI states is used as a reference RS, and the RSs in other activated TCI states is measured, and the measured frequency offsets relative to the estimated/measured frequency offset of the reference RS is reported.

For PDCCH, the MAC CE can activate 2 TCI states and one of the TCI states can include a RS as the reference RS, while the other TCI state can include the RS that is to be measured. The offset/difference/delta of estimation frequency offset between this RS and the reference RS can be reported. In order to measure the RS in these two TCI states, the reference RS can be configured in the CSI report configuration. The reporting can be enabled by RRC parameters, and can also can be indicated to the UE by activating two TCI states for the PDCCH.

In some embodiments, not all the CORESETs are activated with 2 TCI states. Thus, the CSI report configuration can be associated with the CORESET ID, e.g., the RS in the TCI states in the CORESET activated with 2 TCI states can be configured in the CSI report configuration. The offset/difference/delta of the frequency offsets of the two RSs in the two activated TCI states should be reported.

For PDSCH, the MAC CE can activate up to 8 codepoints, and each codepoint can contain one or 2 TCI states. In the SFN scenario, 2 TCI states can be indicated in one codepoint. The RS in one TCI state of the TCI states activated by MAC CE can be used as the reference RS, and the RSs of the other TCI can be measured so that the offsets/differences/deltas between these RSs and the reference RS can be reported, and the reported value can be one or several values from one group configured by higher layer parameters In some embodiments, if the RSs configured in TCI states in the indicated codepoint are to be measured and reported, one RS in one TCI state (e.g., the first TCI state) of the indicated codepoint is used/designated/selected as the reference RS, and the RS in the other TCI state is measured and the offset/difference/delta of the frequency offset between this RS and the reference RS is reported.

The RSs in the TCI pairs can be measured and reported. For example, in Table 1.1, 8 codepoints are activated for the PDSCH, and some of the codepoints contain only one TCI state, and some other codepoints can contain 2 TCI states. The RS in the codepoint containing 2 TCI states can be used to measure frequency offset and can be reported. In Table 1.1, 4 TCI codepoints each contain 2 TCI states, and only the RSs in these 8 TCI states are measured and reported, and one RS in one TCI state can be used as the reference RS. Additionally or alternatively, the RSs of each of the different codepoints are measured and reported individually. One RS in each codepoint is the reference RS (configured by higher layer parameter or default or predefined), and the other RS in the TCI state in the same codepoint can be measured and reported relative to the reference RS of this codepoint. For example, in Table 1.1, one RS in each codepoint containing 2 TCI states should be used as the reference RS, the first TCI state in each codepoint can be used as the reference RS, e.g., T1, T0, T4 and T2. In some embodiments, for codepoint 001, the RS in T1 is used as the reference RS, and both of the RS in T1 and the RS in T3 are measured. In some embodiments, if the frequency offsets are estimated as −500 Hz and 500 Hz, the offset/difference is 1000 Hz and it is reported to gNB of this codepoint. Some embodiments are similar for codepoints 100, 101, and 110 as compared to codepoint 001. The RSs in the activated TCI codepoint to be measured by UE can be configured in the CSI report configuration. Table 1.1 is shown herein:

TABLE 1.1

| TCI codepoint | TCI state |
| --- | --- |
| 000 | T4 |
| 001 | T1 & T3 |

TABLE 1.1-continued

| TCI codepoint | TCI state |
| --- | --- |
| 010 | T2 |
| 011 | T3 |
| 100 | T0 & T5 |
| 101 | T4 & T6 |
| 110 | T2 & T7 |
| 111 | T0 |

In some embodiments, the reporting of Doppler shift/frequency offset is triggered by a MAC CE signaling. FIG. 3 illustrates an example diagram of TCI States Activation/Deactivation for UE-specific PDSCH MAC CE, in accordance with some embodiments of the present disclosure. The MAC CE can activate 8 codepoints for PDSCH as shown in FIG. 3. N TCI state groups can be activated by MAC CE. In some embodiments, each group is indicated by one codepoint and contains one or 2 TCI states. In some embodiments, as shown in FIG. 3, there are several reserved bit marked as 'It', and the reserved bits can be used/re-purposed/configured to trigger the reporting. There may be several codepoints containing 2 TCI states each, and all the codepoints containing 2 TCI states can be reported by an unified trigger information, so one of the reserved bits can be used to trigger all frequency offset reporting, e.g., the first 'It' in FIG. 3.

Each reporting can be triggered individually by different bit information in MAC CE. In some embodiments, as shown in FIG. 3, one bit is reserved for each codepoint that contains 2 TCI states, and this bit can be used to trigger different frequency offset reporting. Irrespective of whether an absolute value of frequency offset or a difference of the RSs in one pair is reported, the RSs in one pair can be configured or activated in one group, and the RSs contained in the TCI states of one codepoint can be used to be measured and reported as a RS pair. The reserved bit of each codepoint that contains 2 TCI states can be used to trigger the frequency offset reporting. For example, if the 'It' in Oct 3 is activated/set as 1, the RSs in the codepoint containing TCI states $ID_{0,1}$ is triggered to be measured and to be reported.

The frequency offset can be reported by the CSI reporting information or by the MAC CE. In some embodiments, the frequency offset is reported by the CSI reporting, and the absolute frequency offset value or the difference between one RS and the reference RS can be contained in the CSI reporting information. Additionally or alternatively, in some embodiments, the frequency offset is reported by MAC CE signaling. The frequency offset can be reported with the RS pair information, so that the gNB would know the association between the frequency offset and the RS pair(s). If the frequency offset is reported for the PDSCH or the activated TCI state for PDCCH is the same as one of the codepoints activated for PDSCH, the codepoint index or TCI state index can be associated with the reported frequency offset. In some embodiments, the MAC CE contains only the TCI codepoint to be measured and reported.

A MAC CE can be configured for the frequency offset reporting. In some embodiments, one or several RS pairs (TCI states pair) are activated by the MAC CE, each of the pairs of RS are measured by UE, and the absolute frequency offset of each RS or the difference of the frequency offset between a first RS and a second RS of each RS pair is reported. The RS pair can be activated for the PDCCH or PDSCH transmission.

The gNB can configure multiple RS pairs (TRS resource set pairs) and the UE can measure the offset. The gNB can configure the multiple RS pairs (e.g., for frequency offset reporting) and the UE can measure offset/absolute value. In some embodiments, the gNB does not configure the multiple RS pairs, but by default a TCI state or TCI state pair is activated by a MAC CE for PDCCH/PDSCH. The gNB can configure the multiple RS pairs in a CSI-ReportConfig, but at the same time, support UE triggered reporting.

The gNB can specify a periodicity for reporting, or sometimes referred as a time window. The gNB can specify respective thresholds of frequency offset for corresponding TRS pairs (e.g., if do not go past the threshold, then do not report). The UE can use PUCCH to send a SR (scheduling request—to request resource(s) for sending the report). The SR can be a normal (e.g., dedicated) SR for requesting resources for sending the report, or a SR that is to be shared for sending/reporting other information such as BFR (beam failure recovery) information. The UE can use MAC CE signaling to perform an uplink (UL) report. The report can carry an identification/indication associated with the TRS pair, for example, a CORESET ID, a MAC CE codepoint value, or a CSI-ReportConfig ID.

In some embodiments, the reporting of Doppler shift/frequency offset is triggered by the UE. First, in some embodiments, the RS resource set is configured or indicated to the UE to be used for frequency offset measurement and reporting. The RS pairs can be configured by a higher layer parameter. The RS pairs can be the RS pairs from TCI states for PDCCH or PDSCH that are activated by MAC CE. Additionally or alternatively, the RSs can be configured in the CSI report configuration. Once the UE receives the RSs (e.g., TRS, CSI-RS), in some embodiments, the UE estimates the frequency offsets based on these configured or activated RSs. The frequency offsets can be reported by using absolute values, or can include the offset/difference value relative to that of a reference RS (and may also include a frequency offset of the reference RS).

In some embodiments, the reporting is triggered by the UE, e.g., UE reports the frequency offset-related parameters when one or more of the frequency offset-related parameters meets the trigger condition(s). In some embodiments, the trigger conditions include a time window/cycle/periodicity for UE reporting, configured by RRC or by default. In some embodiments, the RSs are transmitted according to a period. For example, for the TRS, the transmission period may be 10 ms, 20 ms, 40 ms or 80 ms, and the TRS is transmitted to UE at (a specific point in) every transmission period. The frequency offset reporting may be reported based on UE capability. For example, if the transmission period of TRS is configured as 10 ms, but the UE did not travel at a very high speed, or the UE cannot support reporting the frequency offset at a very high frequency, then UE can report the frequency offset using a relatively bigger time window compared with the transmission period of TRS, e.g. 40 ms. The time window can be configured by an RRC parameter (selected) from one group of absolute time values. The time window can be a multiple of a RS transmission period to be measured and configured by RRC, a fixed multiple value of a RS transmission period, or a fixed absolute time by default. When the time window is configured or indicated to the UE, the UE can trigger to report the frequency offset to the gNB. In some embodiments, if the frequency offsets are reported as absolute values, each value is associated to one RS in the TCI states; if the frequency offset is reported as a offset/difference/relative-value, one reference RS is chosen from all the configured RSs or from each RS pair, the other RS(s) of the remaining RRC configured RSs or of the respective RS pairs are measured, and the offset/difference between the frequency offset(s) of the other RS(s) and the reference RS is reported.

In some embodiments, one (e.g., constant, fixed, etc.) threshold or a variable (e.g., RS pair specific) threshold of frequency offset of RS pairs is used as the UE trigger condition. In some embodiments, once the UE receives the RSs and estimates the frequency offsets of all the RSs, the UE determines the difference of the frequency offsets of the RS pair. In some embodiments, the UE is configured with one or more thresholds of frequency offset of the RS pairs. In some embodiments, if the difference of frequency offset of the RS pair is larger than the threshold (e.g. RS pair specific threshold, or a common threshold), the UE can trigger a report of the frequency offset.

For example, if two pairs of RS are configured by RRC, or a codepoint containing 2 TCI states is activated by the MAC CE, and each pair contains 2 RSs, then the frequency offsets of the two pairs, respectively, are calculated by UE, and the difference of each pair of RS is determined by the UE. In some embodiments, if the UE configured the threshold of the two pairs as {100 Hz} for example when only one threshold is supported, then all the pairs are compared with this threshold. Alternatively, in some embodiments, if the number of thresholds is configured as the same as the number of RS pairs, the threshold may be {100 Hz, 200 Hz} for two RS pairs as an example, and if the estimated difference of the frequency offset of each pair is less than the (e.g., respective) threshold, the UE determines that the frequency offset of each RS in the same pair is similar and the UE does not report the frequency offset; but if the difference of the frequency offset is larger than the threshold, the UE triggers to report the frequency offset. The time window and the frequency offset threshold can be used individually or jointly.

In some embodiments, once the UE triggered the reporting, the UE requests some UL resource to carry the reporting information. The UE can send an scheduling request (SR) to the gNB, and the scheduling request can be initiated for the frequency offset reporting and can share the same scheduling request with other information, e.g., the scheduling information of beam failure recovery (BFR). In some embodiments, once the gNB receives the scheduling request from the UE, the gNB schedules some UL resources, and the UE can report the frequency offset information on the UL resources by using MAC CE signaling/transmission.

In some embodiments, the reporting is triggered by UE, so the frequency offset is reported with the RS pair information, and the gNB determines the association between the frequency offset and the RS pair(s). The frequency offset(s) may be measured for PDCCH transmissions. Thus, in some embodiments, the frequency offset is associated with the CORESET index (ID), the gNB determines that the frequency offset(s) are associated to which CORESET(s). In some embodiments, if the frequency offset is reported for the PDSCH or the activated TCI state for the PDCCH is the same as one of the codepoint activated for the PDSCH, the codepoint index or TCI state index is associated with the reported frequency offset.

Figure 4:
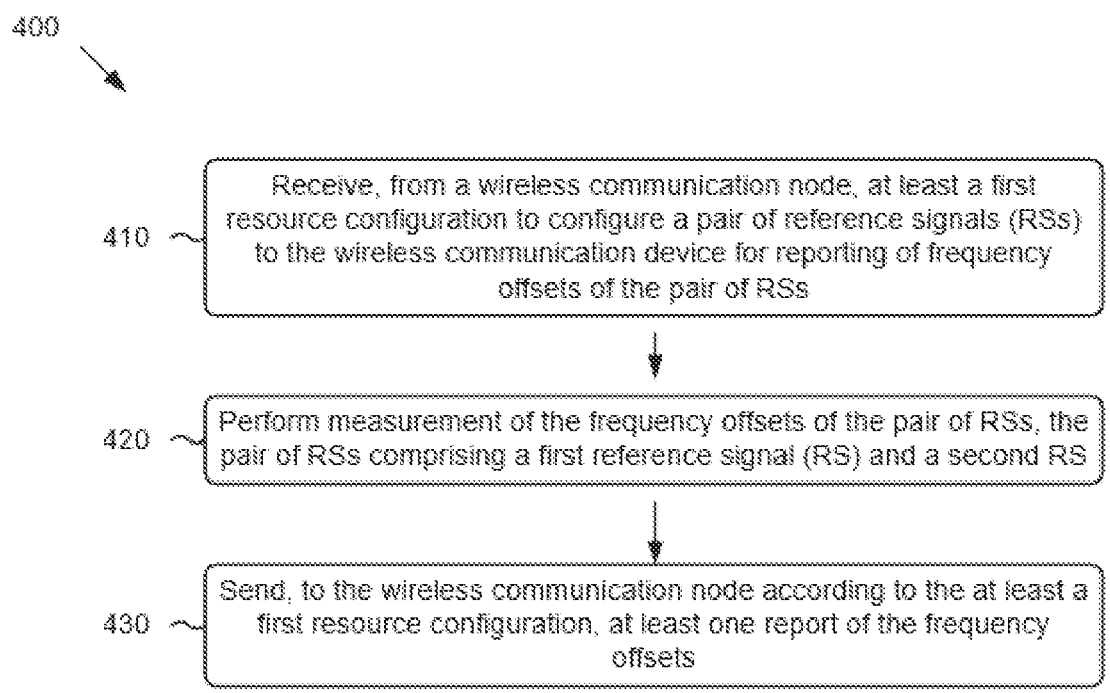
FIG. 4 illustrates a flowchart diagram of a method for reporting frequency offset, in accordance with some embodiments of the present disclosure.

FIG. 4 illustrates a flowchart diagram of a method 400 for reporting frequency offset, in accordance with some embodiments of the present disclosure. Referring to FIGS. 1-3, the method 400 can be performed by a wireless communication device (e.g., a UE) and/or a wireless communication node (e.g., base station), in some embodiments.

Additional, fewer, or different operations may be performed in the method 400 depending on the embodiment.

In brief overview, in some embodiments, a wireless communication device receives, from a wireless communication node, at least a first resource configuration to configure a pair of reference signals (RSs) to the wireless communication device for reporting of frequency offsets of the pair of RSs (operation 410). In some embodiments, the wireless communication device performs measurement of the frequency offsets of the pair of RSs, the pair of RSs including a first reference signal (RS) and a second RS (operation 420). In some embodiments, the wireless communication device sends, to the wireless communication node according to the at least a first resource configuration, at least one report of the frequency offsets (operation 430).

In more detail, at operation 410, in some embodiments, the wireless communication device receives, from the wireless communication node, at least the first resource configuration to configure the pair of reference signals (RSs) to the wireless communication device for reporting of the frequency offsets of the pair of RSs. In some embodiments, the wireless communication device is a UE and the wireless communication node is a gNB (e.g., BS). In some embodiments, the first resource configuration (e.g., CSI resource configuration) is or includes a channel state indicator (CSI)-ReportConfig.

In some embodiments, the wireless communication device receives, from the wireless communication node, a first report configuration (e.g., CSI-portConfig) corresponding to a first RS of the RS pair, and a second report configuration corresponding to a second RS of the RS pair. In some embodiments, a first TRS resource set is part of the first RS pair and a second TRS resource set is part of a second RS pair. In some embodiments, the first report configuration is same as the first resource configuration, while in other embodiments, the first report configuration is different from the first resource configuration. In some embodiments, the wireless communication device receives, from the wireless communication node, a first report configuration including a configuration of at least (a) a first RS resource set corresponding to the first RS, and (b) a second RS resource set corresponding to the second RS.

In some embodiments, a medium access control control element (MAC CE) signaling activates at least one transmission configuration indicator (TCI) state for physical downlink control channel (PDCCH) or physical downlink shared channel (PDSCH) transmission, or for frequency offset reporting. In some embodiments, the MAC CE signaling is used to transmit the frequency offset reporting.

In some embodiments, MAC CE signaling activates two TCI states for PDCCH transmission, a first TCI state of the two TCI states includes a reference RS, a second TCI state of the two TCI states includes a remaining RS, and the difference between frequency offsets includes an offset of a frequency offset of the remaining RS relative to a frequency offset of the reference RS. In some embodiments, the MAC CE signaling activates two TCI states for the PDSCH, a first or second TCI state of the two TCI states in one codepoint is predetermined to include the reference RS, and the difference between frequency offsets includes an offset of a frequency offset of the remaining RS relative to a frequency offset of the reference RS. In some embodiments, the MAC CE signaling activates a plurality of codepoints for the PDSCH, and a first TCI state in each codepoint having two TCI states is predetermined to include a respective reference RS.

At operation 420, in some embodiments, the wireless communication device performs measurement of the frequency offsets of the pair of RSs. In some embodiments, the pair of RSs include the first RS and the second RS. In some embodiments, each of the first RS and the second RS is configured as a reference signal resource, or a reference signal resource set. In some embodiments, the pair of RSs is configured via radio resource control (RRC) signaling, or from one codepoint activated with two transmission configuration indicator (TCI) states, or from one control resource set (CORESET) activated with two TCI states. In some embodiments, the pair of RSs includes a reference RS configured by default or via RRC signaling, and a remaining RS, and the difference between frequency offsets includes/is an offset/difference of a frequency offset of the remaining RS relative to a frequency offset of the reference RS. In some embodiments, at least one of: the pair of RSs is configured via the RRC signaling, the pair of RSs is contained in the TCI states activated for one CORESET, and the CORESET is activated with the two TCI states.

At operation 430, in some embodiments, the wireless communication device sends, to the wireless communication node according to the at least a first resource configuration, at least one report of the frequency offsets. In some embodiments, the wireless communication device sends, to the wireless communication node, the at least one report in response to an configuration in RRC signaling, or in response to MAC CE signaling, or in response to a trigger of the wireless communication device. In some embodiments, the at least one report of the frequency offsets includes at least one value configured by a higher layer parameter. In some embodiments, the report of the frequency offsets includes a report-quantity parameter set to Doppler shift offset or frequency offset.

In some embodiments, the wireless communication device sends, to the wireless communication node, at least a first report and a second report in response to a single indication in MAC CE signaling; or sends, to the wireless communication node, a first report in response to a first indication in the MAC CE signaling, and a second report in response to a second indication in the MAC CE signaling. In some embodiments, a single indication is a single reserved bit. In some embodiments, a first indication and a second indication are different reserved bits.

In some embodiments, the wireless communication device sends, to the wireless communication node, the at least one report of the frequency offsets according to a periodicity or time window in a default configuration or configured via RRC signaling. In some embodiments, the wireless communication device sends, to the wireless communication node, the at least one report including: information of a first pair of frequency offsets of a first pair of RSs, if a difference between the first pair of frequency offsets is larger than a common threshold, and information of a second pair of frequency offsets of a second pair of RSs, if a difference between the second pair of frequency offsets is larger than the common threshold; or sends, to the wireless communication node, the at least one report including: the information of the first pair of frequency offsets of the first pair of RSs, if the difference between the first pair of frequency offsets is larger than a first threshold, and the information of the second pair of frequency offsets of the second pair of RSs, if the difference between the second pair of frequency offsets is larger than a second threshold. In some embodiments, the common threshold is a single threshold, whereas the second threshold is a varying threshold (e.g., having values that are each specific to a RS pair).

In some embodiments, the wireless communication device sends, to the wireless communication node, the at least one report including: information of frequency offsets of a pair of RSs, and an ID of a CORESET associated with the pair of RSs. In some embodiments, the wireless communication device sends, to the wireless communication node, the at least one report including: information of frequency offsets of a pair of RSs, and an ID of a codepoint or TCI state associated with the pair of RSs. In some embodiments, the wireless communication device sends, to the wireless communication node, a scheduling request for an uplink resource to report the frequency offsets, or a shared scheduling request for beam failure recovery (BFR) and for the uplink resource. In some embodiments, the wireless communication device sends, to the wireless communication node, the at least one report including absolute values of the frequency offsets of the pair of RSs, or a difference between the frequency offsets of the pair of RSs.

Figure 5:
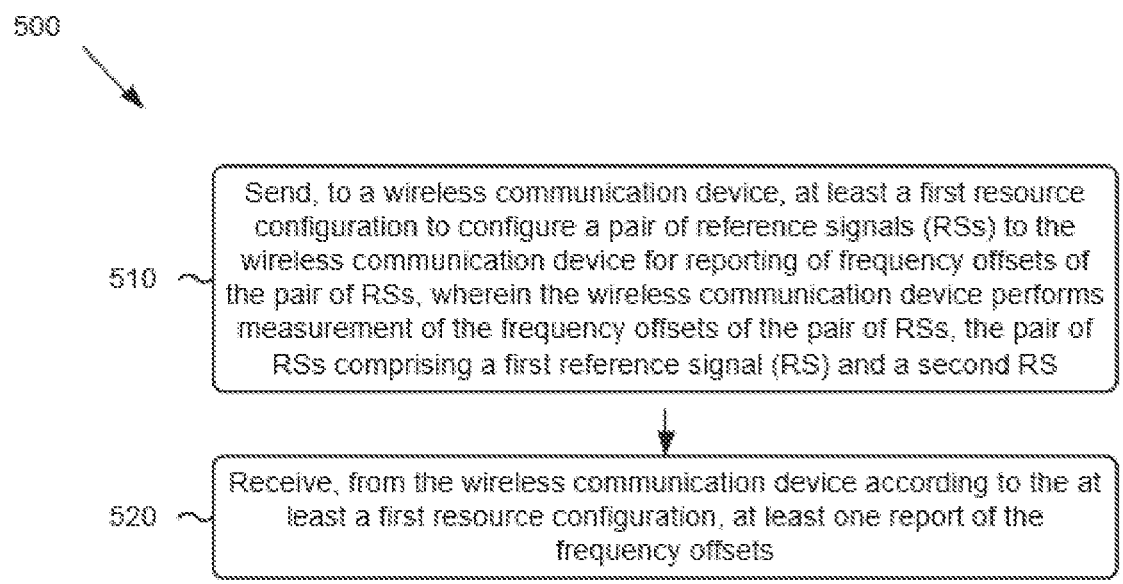
FIG. 5 illustrates another flowchart diagram of a method for reporting frequency offset, in accordance with some embodiments of the present disclosure.

FIG. 5 illustrates a flowchart diagram of a method 500 for reporting frequency offset, in accordance with some embodiments of the present disclosure. Referring to FIGS. 1-3, the method 500 can be performed by a wireless communication node (e.g., a gNB), and/or a wireless commination device (e.g., UE), in some embodiments. Additional, fewer, or different operations may be performed in the method 500 depending on the embodiment.

In brief overview, in some embodiments, a wireless communication node sends, to a wireless communication device, at least a first resource configuration to configure a pair of reference signals (RSs) to the wireless communication device for reporting of frequency offsets of the pair of RSs, wherein the wireless communication device performs measurement of the frequency offsets of the pair of RSs, the pair of RSs including a first reference signal (RS) and a second RS (operation 510). In some embodiments, the wireless communication node receives, from the wireless communication device according to the at least a first resource configuration, at least one report of the frequency offsets (operation 520).

In more detail, at operation 510, in some embodiments, the wireless communication node sends, to a wireless communication device, at least a first resource configuration to configure a pair of reference signals (RSs) to the wireless communication device for reporting of frequency offsets of the pair of RSs, wherein the wireless communication device performs measurement of the frequency offsets of the pair of RSs, the pair of RSs including a first reference signal (RS) and a second RS. In some embodiments, the wireless communication device sends, to the wireless communication device, a first report configuration corresponding to a first RS of the RS pair, and a second report configuration corresponding to a second RS of the RS pair.

At operation 520, in some embodiments, the wireless communication node receives, from the wireless communication device according to the at least a first resource configuration, at least one report of the frequency offsets. In some embodiments, the wireless communication node receives, from the wireless communication device, the at least one report, wherein the wireless communication device sends the at least one report in response to an configuration in RRC signaling, or in response to MAC CE signaling, or in response to a trigger of the wireless communication device.

In some embodiments, a non-transitory computer readable medium stores instructions, which when executed by at least one processor, cause the at least one processor to perform any of the methods described above. In some embodiments, an apparatus includes at least one processor configured to implement any of the methods described above.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
  receiving, by a wireless communication device from a wireless communication node, at least a first resource configuration to configure a pair of reference signals (RSs) to the wireless communication device for reporting of frequency offsets of the pair of RSs;
  performing, by the wireless communication device, measurement of the frequency offsets of the pair of RSs, the pair of RSs comprising a first reference signal (RS) and a second RS; and
  sending, by the wireless communication device to the wireless communication node according to the at least a first resource configuration, at least one report of the frequency offsets.

2. The method of claim 1, wherein each of the first RS and the second RS is configured as:
  a reference signal resource, or
  a reference signal resource set.

3. The method of claim 1, comprising:
  sending, by the wireless communication device to the wireless communication node, the at least one report in response to an configuration in a radio resource control (RRC) signaling, or in response to a medium access control control element (MAC CE) signaling, or in response to a trigger of the wireless communication device.

4. The method of claim 1, comprising:
  receiving, by the wireless communication device from the wireless communication node, a first report configuration corresponding to the first RS of the RS pair, and a second report configuration corresponding to the second RS of the RS pair.

5. The method of claim 1, comprising:
  receiving, by the wireless communication device from the wireless communication node, a first report configuration including a configuration of at least (a) a first RS resource set corresponding to the first RS, and (b) a second RS resource set corresponding to the second RS.

6. The method of claim 1, wherein the report of the frequency offsets includes:
  a report-quantity parameter set to a Doppler shift offset or a frequency offset in the CSI report configuration.

7. The method of claim 1, wherein the at least one report of the frequency offsets includes at least one value configured by a higher layer parameter.

8. The method of claim 1, comprising:
  sending, by the wireless communication device to the wireless communication node, at least a first report and a second report in response to a single indication in a medium access control control element (MAC CE) signaling; or
  sending, by the wireless communication device to the wireless communication node, a first report in response to a first indication in the MAC CE signaling, and a second report in response to a second indication in the MAC CE signaling.

9. The method of claim 8, wherein the MAC CE signaling activates at least one transmission configuration indicator (TCI) state for physical downlink control channel (PDCCH) or physical downlink shared channel (PDSCH) transmission, or for frequency offset reporting.

10. The method of claim 1, comprising:
  sending, by the wireless communication device to the wireless communication node, the at least one report of the frequency offsets according to a periodicity or time window in a default configuration or configured via radio resource control (RRC) signaling.

11. The method of claim 1, comprising:
  sending, by the wireless communication device to the wireless communication node, the at least one report comprising: information of a first pair of frequency offsets of a first pair of RSs, if a difference between the first pair of frequency offsets is larger than a common threshold, and information of a second pair of frequency offsets of a second pair of RSs, if a difference between the second pair of frequency offsets is larger than the common threshold; or sending, by the wireless communication device to the wireless communication node, the at least one report comprising: the information of the first pair of frequency offsets of the first pair of RSs, if the difference between the first pair of frequency offsets is larger than a first threshold, and the information of the second pair of frequency offsets of the second pair of RSs, if the difference between the second pair of frequency offsets is larger than a second threshold.

12. The method of claim 1, comprising:
sending, by the wireless communication device to the wireless communication node, the at least one report comprising: information of frequency offsets of a pair of RSs, and an identifier (ID) of a control resource set (CORESET) associated with the pair of RSs.

13. The method of claim 1, comprising:
sending, by the wireless communication device to the wireless communication node, the at least one report comprising: information of frequency offsets of a pair of RSs, and an identifier (ID) of a codepoint or transmission configuration indicator (TCI) states associated with the pair of RSs.

14. The method of claim 1, comprising:
sending, by the wireless communication device to the wireless communication node, a scheduling request for an uplink resource to report the frequency offsets, or a shared scheduling request for beam failure recovery (BFR) and for the uplink resource.

15. The method of claim 1, comprising:
sending, by the wireless communication device to the wireless communication node, the at least one report comprising:
absolute values of the frequency offsets of the pair of RSs, or
a difference between the frequency offsets of the pair of RSs.

16. The method of claim 1, wherein the pair of RSs is:
configured via radio resource control (RRC) signaling, or
from one codepoint activated with two transmission configuration indicator (TCI) states, or
from one control resource set (CORESET) activated with two TCI states.

17. The method of claim 1, wherein:
the pair of RSs includes a reference RS configured by default or via radio resource control (RRC) signaling, and a remaining RS, and
a difference between frequency offsets comprises an offset of a frequency offset of the remaining RS relative to a frequency offset of the reference RS.

18. A wireless communication device, comprising:
at least one processor configured to:
receive, via a transceiver from a wireless communication node, at least a first resource configuration to configure a pair of reference signals (RSs) to the wireless communication device for reporting of frequency offsets of the pair of RSs;
perform measurement of the frequency offsets of the pair of RSs, the pair of RSs comprising a first reference signal (RS) and a second RS; and
send, via the transceiver to the wireless communication node according to the at least a first resource configuration, at least one report of the frequency offsets.

19. A method, comprising:
sending, by a wireless communication node to a wireless communication device, at least a first resource configuration to configure a pair of reference signals (RSs) to the wireless communication device for reporting of frequency offsets of the pair of RSs, wherein the wireless communication device performs measurement of the frequency offsets of the pair of RSs, the pair of RSs comprising a first reference signal (RS) and a second RS; and
receiving, by the wireless communication node from the wireless communication device according to the at least a first resource configuration, at least one report of the frequency offsets.

20. A wireless communication node, comprising:
at least one processor configured to:
send, via a transceiver to a wireless communication device, at least a first resource configuration to configure a pair of reference signals (RSs) to the wireless communication device for reporting of frequency offsets of the pair of RSs, wherein the wireless communication device performs measurement of the frequency offsets of the pair of RSs, the pair of RSs comprising a first reference signal (RS) and a second RS; and
receive, via the transceiver from the wireless communication device according to the at least a first resource configuration, at least one report of the frequency offsets.

* * * * *